(12) United States Patent
Westwater

(10) Patent No.: US 9,915,353 B2
(45) Date of Patent: Mar. 13, 2018

(54) CHOKED FLOW VALVE WITH CLAMPED SEAT RING

(71) Applicant: FISHER CONTROLS INTERNATIONAL LLC, Marshalltown, IA (US)

(72) Inventor: David J. Westwater, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 37 days.

(21) Appl. No.: 14/919,009

(22) Filed: Oct. 21, 2015

(65) Prior Publication Data

US 2016/0116072 A1   Apr. 28, 2016

Related U.S. Application Data

(60) Provisional application No. 62/069,533, filed on Oct. 28, 2014.

(51) Int. Cl.
| | |
|---|---|
| *F16K 1/42* | (2006.01) |
| *F16K 25/00* | (2006.01) |
| *F16K 47/08* | (2006.01) |

(52) U.S. Cl.
CPC ............. *F16K 1/42* (2013.01); *F16K 1/427* (2013.01); *F16K 25/005* (2013.01); *F16K 47/08* (2013.01)

(58) Field of Classification Search
None
See application file for complete search history.

(56) References Cited

U.S. PATENT DOCUMENTS

| | | | |
|---|---|---|---|
| 6,701,958 B2* | 3/2004 | Baumann | F16K 39/022 137/625.33 |
| 7,044,434 B2 | 5/2006 | Brinks et al. | |
| 7,086,417 B2* | 8/2006 | De Almeida | F04F 1/20 138/44 |
| 8,038,121 B2* | 10/2011 | Gessaman | F16K 1/38 251/122 |
| 8,740,179 B2* | 6/2014 | Griffin, Jr. | F16K 47/08 251/127 |

(Continued)

FOREIGN PATENT DOCUMENTS

| | | |
|---|---|---|
| WO | WO-03016759 A1 | 2/2003 |
| WO | WO-2011147078 A1 | 12/2011 |

OTHER PUBLICATIONS

International Search Report for International application No. PCT/US2015/057693, dated Jan. 22, 2016.

(Continued)

*Primary Examiner* — John Fox
(74) *Attorney, Agent, or Firm* — Marshall, Gerstein & Borun LLP

(57) ABSTRACT

A fluid valve includes a valve body having a fluid inlet and a fluid outlet connected by a fluid passageway. A valve seat is disposed within the fluid passageway. A fluid control member is movably disposed within the fluid passageway, the fluid control member cooperating with a trim assembly to control fluid flow through the fluid passageway. The valve seat is clamped into the valve body and the fluid valve operates under choked flow at a pressure drop of 10% or less of the inlet fluid pressure.

12 Claims, 4 Drawing Sheets

(56) References Cited

U.S. PATENT DOCUMENTS

2008/0258097 A1\* 10/2008 Griffin .................... F16K 47/08
　　　　　　　　　　　　　　　　　　　　　　　251/359
2009/0320931 A1\* 12/2009 Wears ..................... F16K 47/08
　　　　　　　　　　　　　　　　　　　　　　　137/15.18
2014/0264135 A1　　9/2014 Bell

OTHER PUBLICATIONS

Written Opinion for International application No. PCT/US2015/057693, dated Jan. 22, 2016.
International Preliminary Report on Patentability for International application No. PCT/2015/057693, dated May 2, 2017.

\* cited by examiner

CHOKED FLOW VALVE WITH CLAMPED SEAT RING

FIELD OF THE DISCLOSURE

The invention generally relates to control valves and more specifically to choked flow control valves having a clamped seat ring.

BACKGROUND

Fluid valves control the flow of fluid from one location to another. When the fluid valve is in a closed position, high pressure fluid on one side is prevented from flowing to a lower pressure location on the other side of the valve. Often fluid valves contain a movable fluid control member and a seat of some sort that cooperates with the fluid control member to control fluid flow through the valve. In some cases it may be desirable to characterize fluid as it flows through the valve, for example, to reduce noise. In these cases, a trim assembly may be used that includes a cage with a plurality of openings. The openings may be sized and shaped to characterize fluid flow through the trim assembly. However, the characterization of the fluid flow through the valve comes at the expense of a large pressure drop as fluid flows through the trim assembly.

In one example of a known fluid control valve, as illustrated in FIG. 1, a control valve 10 includes a valve body 12 having a fluid inlet 14 and a fluid outlet 16 connected by a fluid passageway 18. A trim assembly 20 is disposed within the valve body 12 between the fluid inlet 14 and the fluid outlet 16. The trim assembly 20 includes a cage 22 and a seat ring 24. A fluid control member, such as a plug 26 is disposed within the cage 22 and the plug 26 interacts with the seat ring 24 to control fluid flow through the valve body 12. A stem 28 is connected to the plug 26 at one end and an actuator 30 at another end. The actuator 30 controls movement of the plug 26 within the cage 22.

In some operations, a control valve is required to operate in a choked flow condition. Choked flow occurs when the velocity of fluid flowing through the control valve reaches supersonic speed (e.g., about 1070 feet per second for fuel flowing through the control valve for gas turbine electricity generation operations). In order to increase efficiency of choked flow control valves in gas turbine electricity generation, the choked flow condition should occur at a pressure drop of 10% or less of the inlet pressure. Flow obstructions, for example trim cages, cause the flow to choke more slowly and at higher pressure drops, which decreases the efficiency of the turbines. In order to solve this problem, current gas turbine engines include fuel control valves that have a threaded seat ring and a skirt guided plug to create a large unobstructed fuel flow region through the control valve.

In one example, as illustrated in FIG. 2, a known choked flow control valve 110 includes a valve body 112 having a fluid inlet 114 and a fluid outlet 116 connected by a fluid passageway 118. A trim assembly 120 is disposed within the valve body 112 between the fluid inlet 114 and the fluid outlet 116. The trim assembly 120 includes a skirt 122 and a seat ring 124. A fluid control member, such as a plug 126 is disposed at least partially within the skirt 122 and the plug 126 interacts with the seat ring 124 to control fluid flow through the valve body 112. The skirt 122 guides the plug 126 in reciprocating motion (e.g., up and down in FIG. 2) so that the plug 126 remains correctly aligned with the seat ring 124. A stem 128 is connected to the plug 126 at one end and an actuator 130 at another end. The actuator 130 controls movement of the plug 126 within the skirt 122. A large flow region 131 is created between the skirt 122 and the seat ring 124 so that flow obstructions through this region are minimized and the choked flow condition occurs at a relatively low pressure drop.

Known threaded seat ring choked flow control valve s suffer from many problems. For example, known threaded seat ring choked flow control valves suffer from inadvertent seat ring back out due to the shock waves generated by the supersonic flow. These shock waves cause intense vibrations, which can cause the seat ring to back out of its threaded and seated position, thereby causing flow disruptions and failure of the control valve.

Known threaded seat ring choked flow control valves also suffer from swirling flow through the gap between the skirt and the seat ring. This problem is caused by the change in flow corridor geometry from the inlet side of the skirt to the back side of the skirt. For example, as illustrated in FIG. 2, fluid flowing into the seat ring on the inlet side is relatively unobstructed as it enters the seat ring. However, flow entering the seat ring from the back side (opposite the inlet side) must change direction multiple times before entering the seat ring. This change in direction causes a change in flow velocity, which also changes the static pressure of the fluid relative to the static pressure of fluid flowing into the seat ring from the inlet side. This pressure differential causes the fluid to swirl as it flows through the seat ring, which reduces efficiency of the control valve and increases the pressure drop through the seat ring.

Furthermore, known threaded seat ring choked flow control valves are relatively expensive to manufacture, for example because the valve body threads must be machined, and are time consuming and difficult to manufacture.

SUMMARY OF THE DISCLOSURE

In one preferred embodiment, a fluid valve includes a valve body having a fluid inlet and a fluid outlet connected by a fluid passageway; a trim assembly disposed within the fluid passageway; and a fluid control member movably disposed within the fluid passageway, the fluid control member cooperating with the trim assembly to control fluid flow through the fluid passageway. The trim assembly includes a clamped seat ring, the clamped seat ring including a convergent-divergent nozzle.

Other preferred embodiments may include one or more of the following preferred forms.

In one preferred form, the trim assembly includes a retainer that clamps the seat ring into the valve body.

In another preferred form, the retainer includes an upper body portion and a skirt that extends away from the upper body portion, the skirt guiding movement of the fluid control member.

In yet another preferred form, the retainer further includes a securement ring that is positioned adjacent to the seat ring, the seat ring being at least partially disposed between the securement ring and the valve body.

In yet another preferred form, the skirt is connected to the securement ring by a plurality of legs.

In yet another preferred form, at least one leg in the plurality of legs has an airfoil cross-sectional shape.

In yet another preferred form, a leading edge of the leg includes a cut water having a sharp edge.

In yet another preferred form, a trailing edge of the leg has a sharp edge.

In yet another preferred form, the airfoil cross-sectional shape maximizes laminar flow.

In yet another preferred form, the plurality of legs includes between three and ten legs.

In another preferred embodiment, a choked flow clamped seat ring assembly includes a seat ring retainer having an upper body portion, a skirt that extends away from the upper body portion, the skirt that is adapted to guide movement of a fluid control member, a securement ring that is spaced apart from the skirt, and a plurality of legs connecting the securement ring to the skirt. A seat ring includes a converging nozzle and a diverging nozzle that meet at vena contracta. The securement ring is adapted to clamp a portion of the seat ring against a valve body.

Other preferred embodiments may include one or more of the following preferred forms.

In one preferred form, at least one leg in the plurality of legs has an airfoil cross-sectional shape.

In another preferred form, a leading edge of the leg includes a cut water having a sharp edge.

In yet another preferred form, a trailing edge of the leg has a sharp edge.

In yet another preferred form, the airfoil cross-sectional shape maximizes laminar flow.

In yet another preferred form, the plurality of legs includes between three and twelve legs.

In yet another preferred form, the seat ring includes an annular shelf that is adapted to be clamped between the securement ring and a valve body.

In yet another preferred form, the diverging nozzle is longer than the converging nozzle.

In yet another preferred form, at least one leg in the plurality of legs curves radially inward from the securement ring to the skirt.

In yet another preferred embodiment, a retainer for a choked flow clamped seat ring assembly includes an upper body portion; a skirt that extends away from the upper body portion, the skirt being adapted to guide movement of a fluid control member; a securement ring spaced apart from the skirt; and a plurality of legs connecting the securement ring to the skirt.

DETAILED DESCRIPTION

The choked flow control valves and trim assemblies described herein advantageously prevent shock wave back out of the seat ring, direct fluid flow through the seat ring and prevent or reduce flow swirling, and reduce manufacturing costs and assembly time. Furthermore, the choked flow control valves and trim assemblies described herein produce 100% or more (preferably 200% or more) open flow area in the vicinity of the seat ring than trim assemblies having cages.

Figure 1:
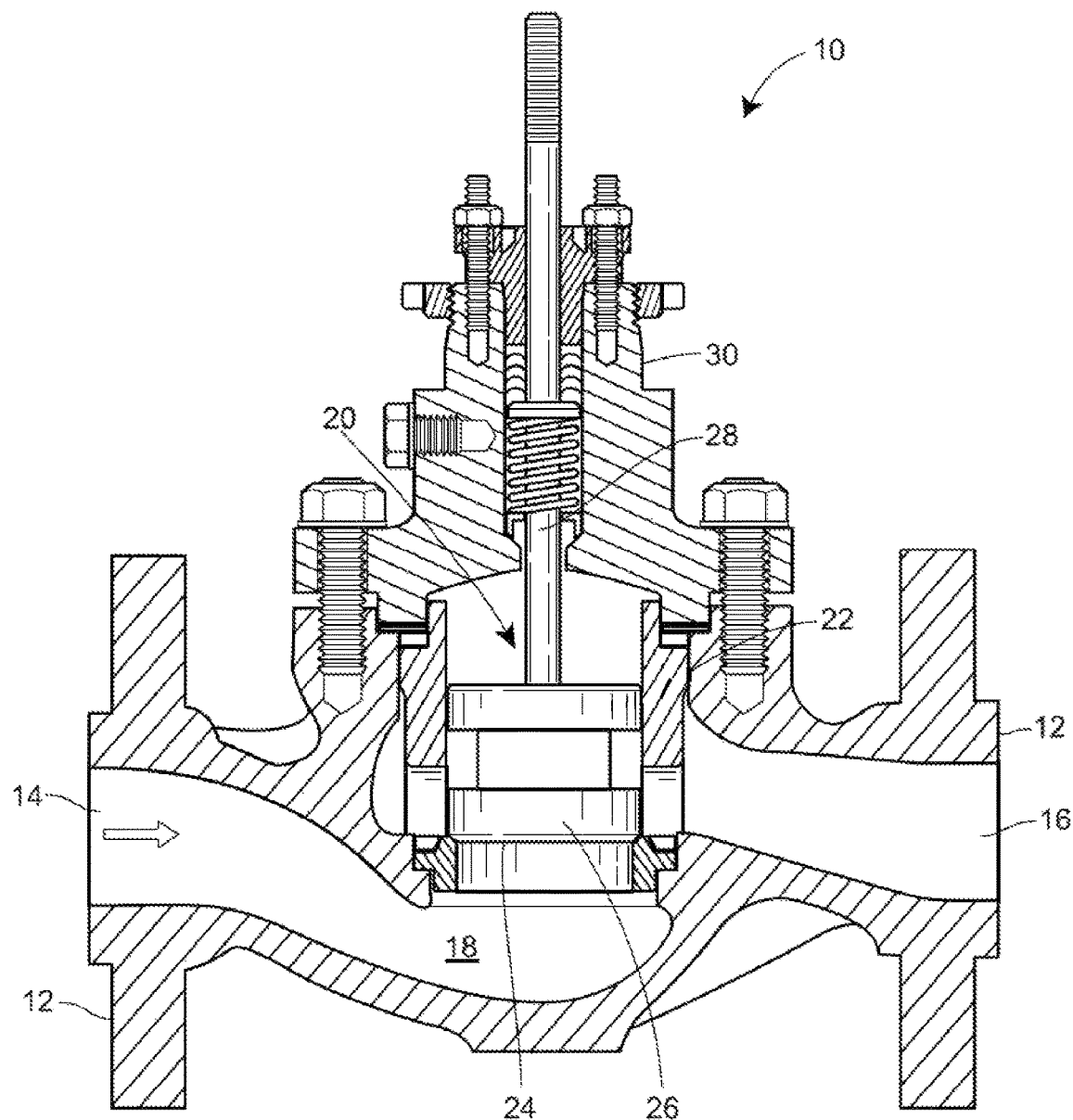
FIG. 1 is a cross-sectional view of a prior art control valve having a trim assembly with a clamped seat ring.
Figure 2:
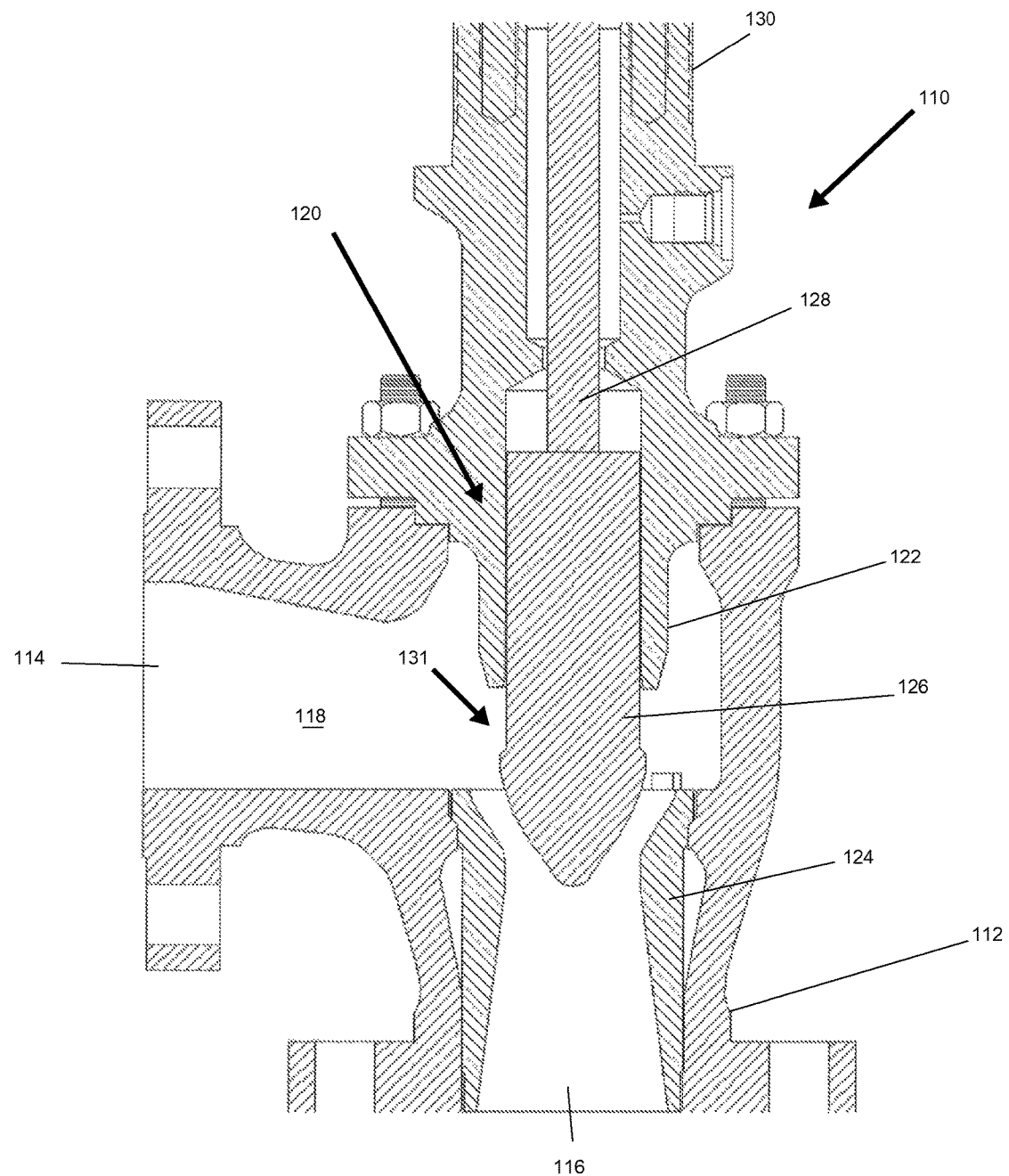
FIG. 2 is a cross-sectional view of a prior art high pressure recovery control valve with a threaded seat ring and a skirt guided plug.
Figure 3:
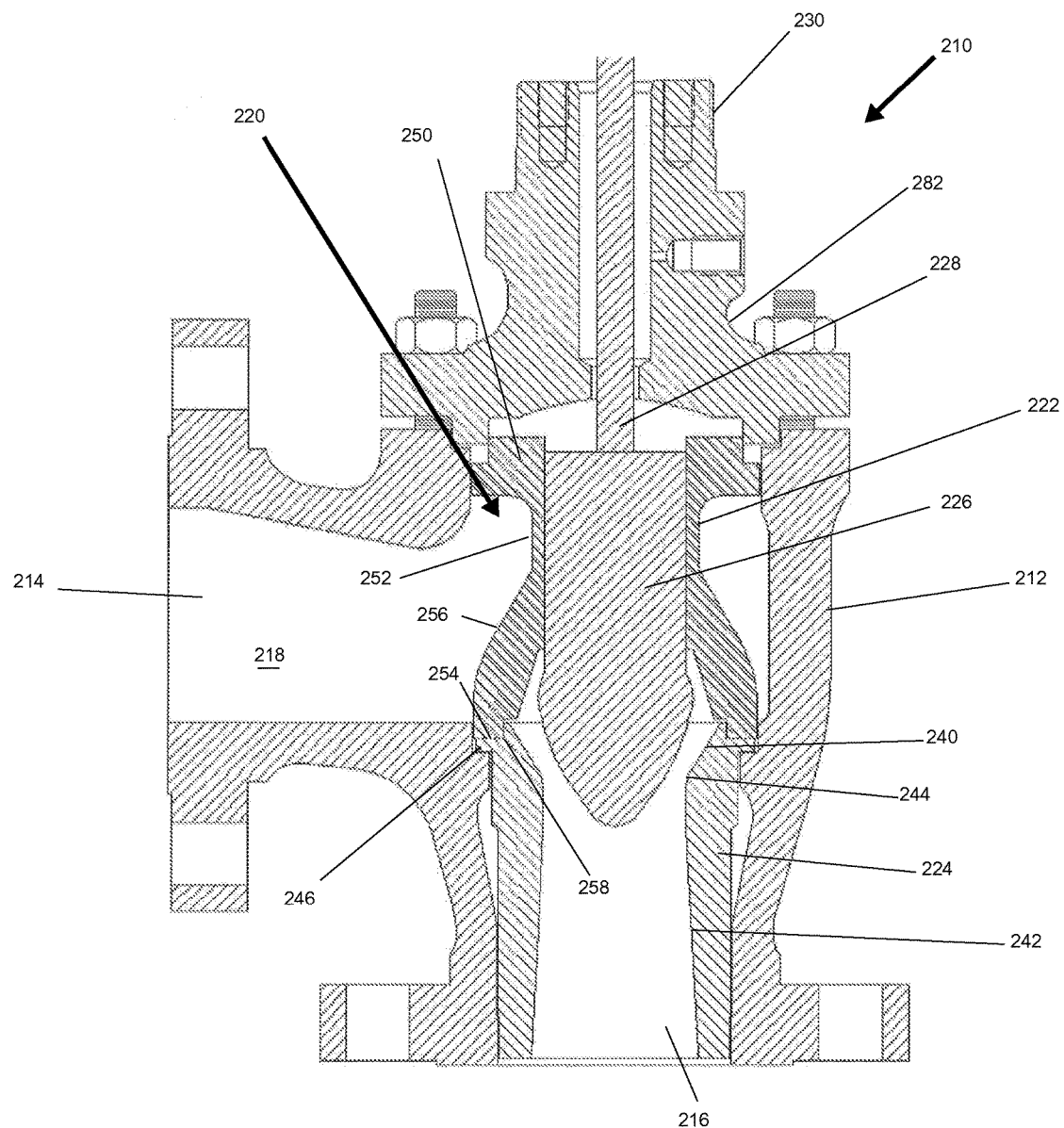
FIG. 3 is cross-sectional view of a high pressure recovery control valve with a clamped seat ring and a retainer constructed in accordance with the teachings of the disclosure.

Turning now to FIG. 3, a control valve 210 includes a valve body 212 having a fluid inlet 214 and a fluid outlet 216 connected by a fluid passageway 218. A trim assembly 220 is disposed within the valve body 212 between the fluid inlet 214 and the fluid outlet 216. The trim assembly 220 includes a retainer 222 and a seat ring 224. A fluid control member, such as a plug 226 is disposed within the retainer 222 and the plug 226 interacts with the seat ring 224 to control fluid flow through the valve body 212. A stem 228 is connected to the plug 226 at one end and an actuator 230 at another end. The actuator 230 controls movement of the plug 226 within the retainer 222.

The seat ring 224 includes a converging portion or converging nozzle 240 and a diverging portion or diverging nozzle 242 that meet at a throat or vena contracta 244. Fluid flowing through the seat ring 224 reaches supersonic velocity at the throat 244. In some embodiments, the diverging nozzle 242 is longer than the converging nozzle 240. In other embodiments, the diverging nozzle 242 may be shorter than the converting nozzle 240, or the diverging nozzle 242 and the converging nozzle 240 may have equal lengths. Regardless, the plug 226 cooperates with a seating surface in the seat ring 224 (such as the throat 244) to control fluid flow through the seat ring.

The seat ring 224 includes an annular shelf 246 that seats against an annular shoulder 248 formed in the valve body 212. The seat ring 224 is clamped in place by the retainer 222, the annular shelf 246 being disposed between the retainer 222 and the annular shoulder 248. As a result, the seat ring 224 is not secured by threads and thus is not subject to backing out from vibrations caused by the supersonic flow. In some embodiments, one or more seals or gaskets (not shown) may be placed between the annular shelf 246 and the annular shoulder 248 and/or between the annular shelf and the retainer 222.

Figure 4:
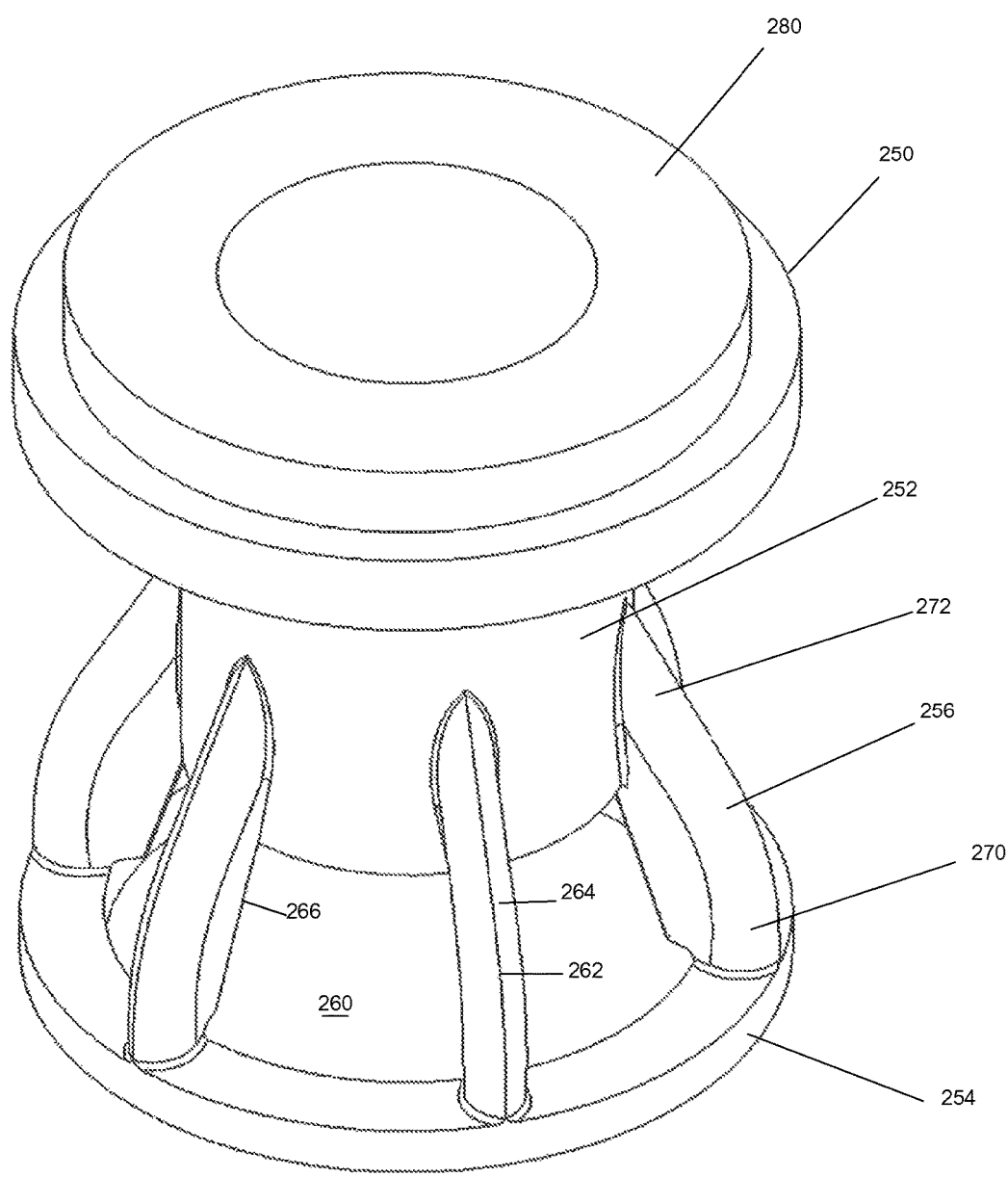
FIG. 4 is perspective view of the retainer of the control valve of FIG. 3.

The retainer 222 includes an upper body portion 250 that is secured within the valve body 212 proximate the actuator 230. A skirt portion 252 extends away from the upper body portion 250 towards a securement ring 254. The securement ring 254 is joined to the skirt portion 252 by a plurality of legs or supports 256. The securement ring 254 fits within an annular recess 258 in the top of the seat ring 224 to clamp the seat ring 224 between the retainer 222 and the valve body 224. In other embodiments, the seat ring 224 may be clamped between the retainer 222 and the valve body 212 without an annular recess 258. The legs 256 separate the skirt 252 from the securement ring 254, thereby creating a large flow area 260 between the skirt 252 and the securement ring 254, as illustrated in FIG. 4.

The legs 256 may have an airfoil cross-sectional shape. In some embodiments the airfoil shape may be a symmetrical airfoil shape (i.e., the camber line may be coincident with the chord line). However, other cross-sectional shapes are possible. The cross-sectional shape of the legs 256 should minimize fluid drag while preventing circumferential flow. In some preferred embodiments, the cross-sectional shape of the legs 256 should emphasize or maximize laminar fluid flow to reduce drag and turbulence. For example, NACA 6 series or 7 series airfoil shapes may be useful in maximizing laminar fluid flow.

In some embodiments, the leading edge of the legs 256 may be formed in a sharp leading edge 262, for example, by adding a wedge or break water 264 to the leading edge 262. In other embodiments, the leading edge may be smooth or rounded, formed by a radiused edge (not shown). The trailing edge 266 may similarly be formed as a sharp edge. Alternatively, the trailing edge 266 may have a rounded or radiused edge.

The legs 256 may also curve radially inward from the securement ring 254 to the skirt 252. For example, the legs 256 may have a lower portion 270 that is attached to the securement ring 254 that is more longitudinally oriented than an upper portion 272 that is attached to the skirt 252. This leg curvature radially offsets the securement ring 254 from the skirt 252. In other words, the securement ring 254 may have an inner diameter that is larger than the outer diameter of the skirt 252 to further increase the flow area 260, which further reduces the pressure drop through the retainer 222.

In the embodiment illustrated in FIGS. 3 and 4, the skirt 252 is connected to the securement ring 254 by six legs 256. In other embodiments, more or less legs 256 may be used. For example, in some preferred embodiments, the number of legs 256 may be three or more, but twelve or less to optimize the relationship between strength and flow area.

The upper body portion 250 may include an alignment cylinder 280 that extends away from the skirt 222. The alignment cylinder 280 may aid in centering or aligning the upper body portion 250 between the valve body 212 and the bonnet 282.

Although certain trim assemblies and control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A fluid valve comprising:
a valve body having a fluid inlet and a fluid outlet connected by a fluid passageway;
a trim assembly disposed within the fluid passageway; and
a fluid control member movably disposed within the fluid passageway, the fluid control member cooperating with the trim assembly to control fluid flow through the fluid passageway;
wherein the trim assembly includes a clamped seat ring, the clamped seat ring including a convergent-divergent nozzle, a diverging portion of the nozzle being longer than a converging portion of the nozzle,
wherein trim assembly includes a retainer that clamps the seat ring into the valve body, the retainer including an upper body portion and a skirt that extends away from the upper body portion, the skirt guiding movement of the fluid control member,
wherein the retainer further includes a securement ring that is positioned adjacent to the seat ring, the seat ring being at least partially disposed between the securement ring and the valve body, and
wherein the skirt is connected to the securement ring by a plurality of legs, at least one leg in the plurality of legs having an airfoil cross-sectional shape, and a trailing edge of the at least one leg having a sharp edge.

2. The fluid valve of claim 1, wherein a leading edge of the at least one leg includes a break water having a sharp edge.

3. The fluid valve of claim 1, wherein the airfoil cross-sectional shape maximizes laminar flow.

4. The fluid valve of claim 1, wherein the plurality of legs includes between three and ten legs.

5. A choked flow clamped seat ring assembly for a choked flow fluid control valve, the assembly comprising:
a seat ring retainer including an upper body portion, a skirt that extends away from the upper body portion, the skirt being adapted to guide movement of a fluid control member, a securement ring spaced apart from the skirt, and a plurality of legs connecting the securement ring to the skirt; and
a seat ring, the seat ring including a converging nozzle and a diverging nozzle that meet at vena contracta, the diverging nozzle being longer that the converging nozzle;
wherein the securement ring is adapted to clamp a portion of the seat ring against a valve body, and
wherein at least one leg in the plurality of legs curves radially inward from the securement ring to the skirt.

6. The assembly of claim 5, wherein at least one leg in the plurality of legs has an airfoil cross-sectional shape.

7. The assembly of claim 6, wherein a leading edge of the leg includes a break water having a sharp edge.

8. The assembly of claim 6, wherein a trailing edge of the leg has a sharp edge.

9. The assembly of claim 6, wherein the airfoil cross-sectional shape maximizes laminar flow.

10. The assembly of claim 5, wherein the plurality of legs includes between three and twelve legs.

11. The assembly of claim 5, wherein the seat ring includes an annular shelf that is adapted to be clamped between the securement ring and a valve body.

12. A retainer for a choked flow clamped seat ring assembly, the retainer comprising:
an upper body portion;
a skirt that extends away from the upper body portion, the skirt being adapted to guide movement of a fluid control member;
a securement ring spaced apart from the skirt; and
a plurality of legs connecting the securement ring to the skirt,
wherein at least one leg in the plurality of legs has an airfoil cross-sectional shape and a leading edge of the leg includes a break water having a sharp edge.

* * * * *